(No Model.) 3 Sheets—Sheet 1.
H. O. C. E. WAGEMANN.
ELECTRIC GENERATOR.
No. 526,064. Patented Sept. 18, 1894.
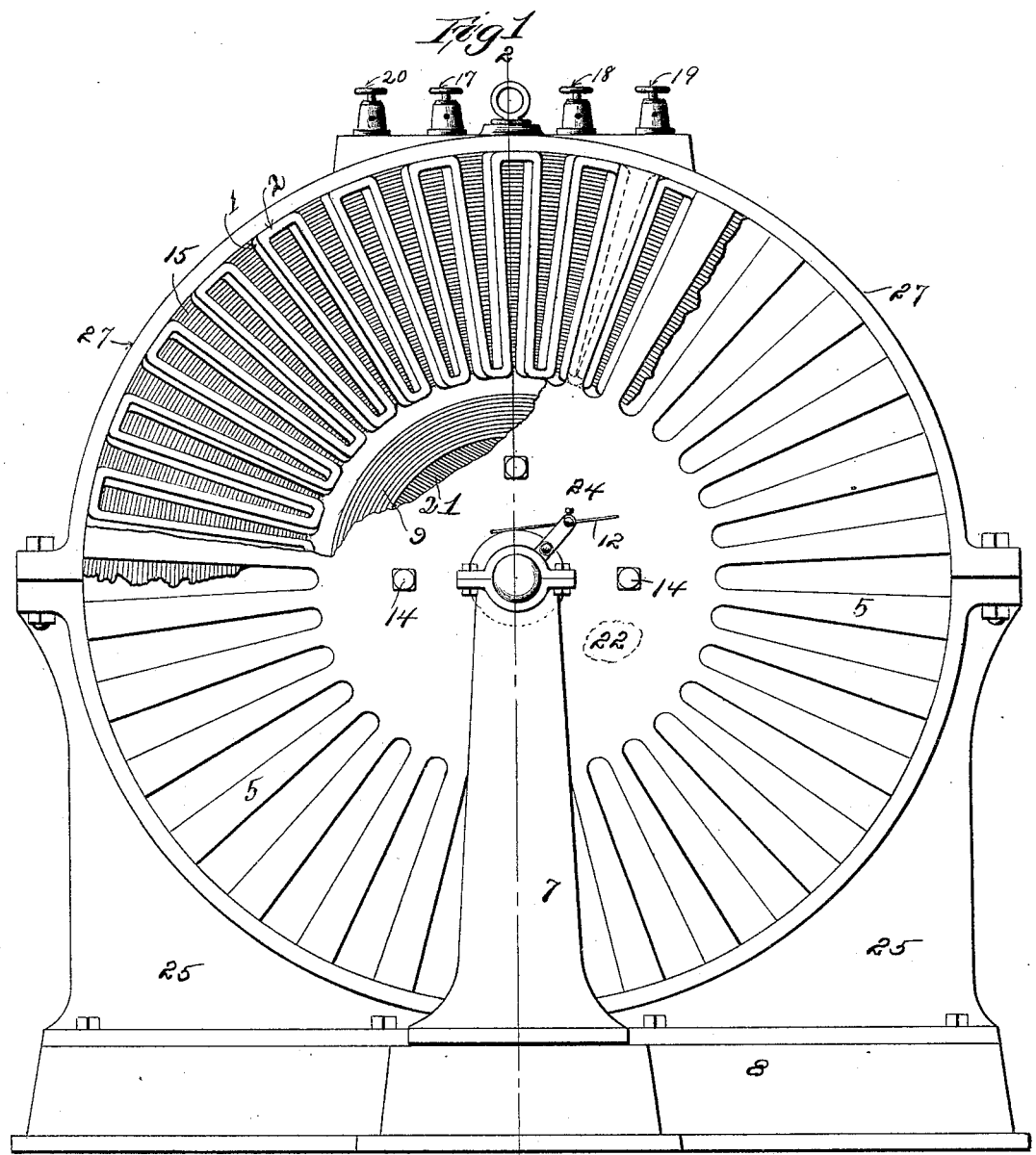

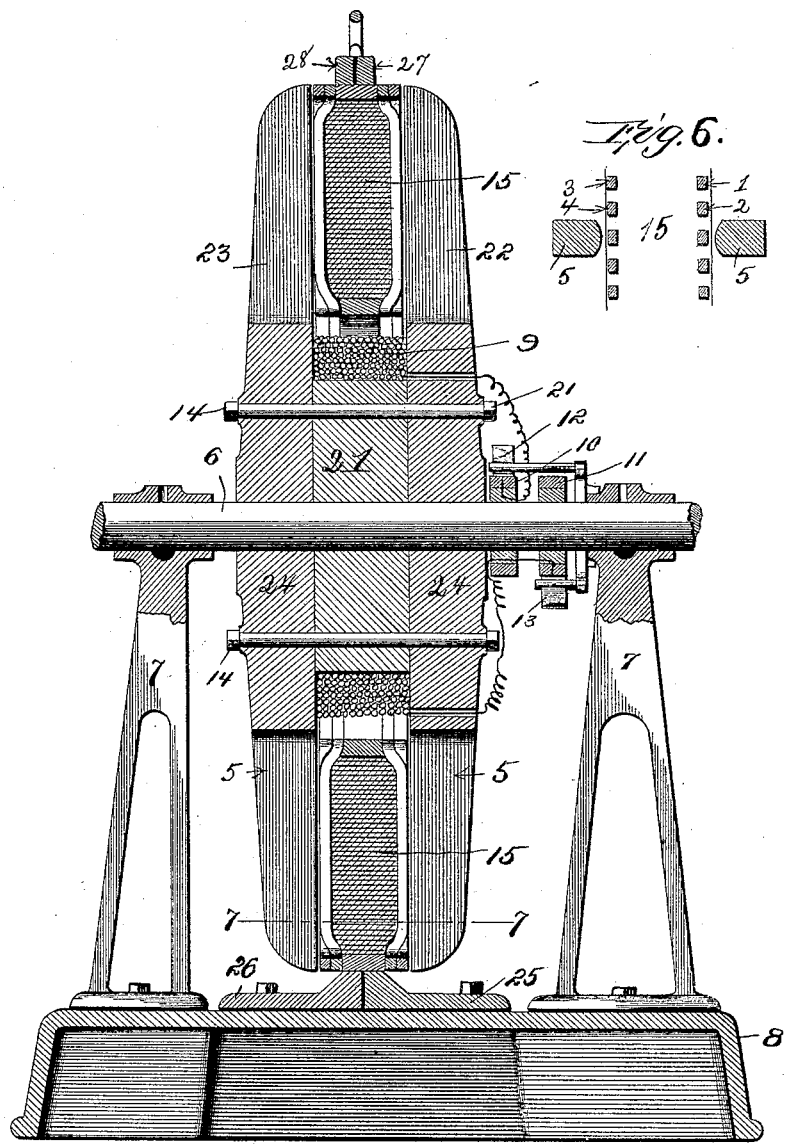

(No Model.) 3 Sheets—Sheet 3.
H. O. C. E. WAGEMANN.
ELECTRIC GENERATOR.
No. 526,064. Patented Sept. 18, 1894.
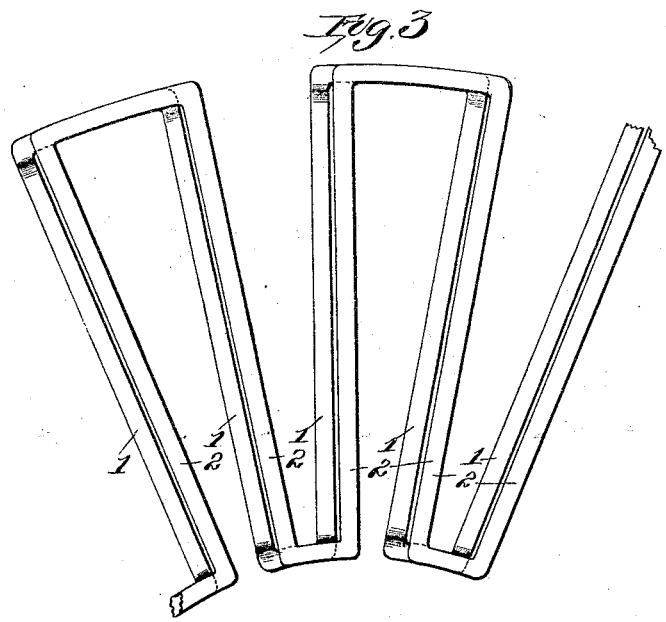
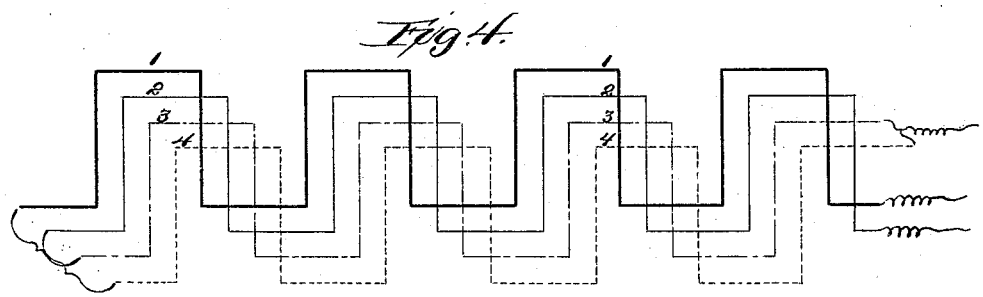
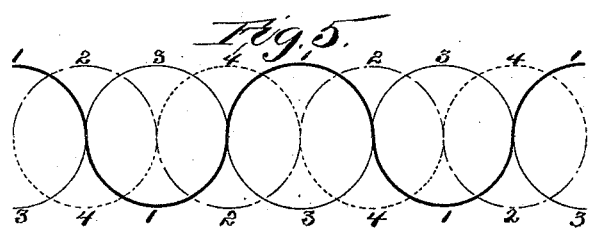
Witnesses:
Inventor
Herman Otto Charles Edmund Wagemann
By Paul Bakewell
his Atty

UNITED STATES PATENT OFFICE.

HERMANN O. C. EDMUND WAGEMANN, OF ST. LOUIS, MISSOURI, ASSIGNOR OF THREE-FOURTHS TO CHARLES F. ORTHWEIN, OF SAME PLACE.

ELECTRIC GENERATOR.

SPECIFICATION forming part of Letters Patent No. 526,064, dated September 18, 1894.

Application filed July 5, 1892. Serial No. 439,042. (No model.)

*To all whom it may concern:*

Be it known that I, HERMANN OTTO CHARLES EDMUND WAGEMANN, a citizen of the United States, residing in the city of St. Louis and State of Missouri, have invented certain new and useful Improvements in Electric Generators, of which the following is a full, clear, and exact description.

My invention relates to improvements in alternate current generators, and has for its object a simple and inexpensive form of construction, adapted to generate a multi-phase current, with comparatively short rotative diametrical dimensions, and in which the saturation of the field magnet is kept practically constant, to provide for the varying conditions under which the current generated by the machine is compensated for; *i. e.*, an established proportion of iron and copper, to maintain a practically constant current, or a magnetic inertia in the machine, as a whole, sufficient to respond to the varying strains put upon a generator in the generation of currents for railroad purposes, or a field magnet, so highly magnetized as to be greatly in excess of the demagnetizing effect of the armature coils when the machine is operating under a heavy load; and a form of construction adapted to generate a current of low potential, at the same time reducing to a minimum the Foucault currents, in the copper conductors and iron core of the armature; one designed for slow speed, and in which the system of armature windings while developing a multi-phase current, is susceptible of such internal connections as to permit of the employment of a number of external circuits, for the conduction or distribution of the currents of different phases, less than the number of phases.

In general, my object is a form of construction designed with special reference to the requirements of a generator of electric power for railroad purposes.

It consists in the details of improvement in the construction of alternate current generators hereinafter described.

In the accompanying drawings, in which like symbols of reference denote like parts in the several views, Figure 1 is a side elevation of my improved generator with part of the polar extensions of the near pole of the field magnet broken away, also showing the near surface of the armature core removed, exposing the embedded armature windings on that face of the same. Fig. 2 is a vertical section, taken parallel to the axis of the machine, or as on the line 2—2 in Fig. 1. Fig. 3 is a view illustrative of the form of windings on one side of the armature. Fig. 4 is a schematic view illustrative of the relative position, circumferentially, of the several windings on the armature. Fig. 5 is a view illustrative of the resultant four-phase waves in the induced currents produced by the machine; and Fig. 6 is a sectional view, taken as on the line 7—7 in Fig. 2.

As illustrated in Figs. 1 and 2, the field magnet of my generator consists in a cylindrical iron core 21, to the parallel end faces of which are removably secured the two similar wheel-shaped pole-pieces, 22 and 23, which, as shown in Fig. 1, are formed with a solid central hub portion 24, and a number of radially disposed polar extensions 5. The core piece 21 is rigidly secured to the axial shaft 6, to which power is applied to operate the machine, which is provided with journal bearings in the standards 7. The standards 7 are rigidly secured to the base-casting 8. Around the core 21, in the space between the flange-like pole-pieces 22 and 23, is wound the exciting coil 9, the terminals of which are, respectively, connected with the two collector rings 10 and 11 secured to, and electrically insulated from, the shaft 6. The exciting current, from any convenient source (not shown), is conducted to the rings 10 and 11, respectively, through the brushes 12 and 13, which are held in revoluble contact therewith.

As shown in Fig. 2, the pole-pieces 22 and 23 are secured to the core 21 by several traverse bolts 14 in the length of which are included the three pieces 21, 22, and 23. These bolts might, in some instances, be advantageously replaced with screw bolts which secure each piece 22 and 23 to the core 21 independently of each other.

The armature consists of an iron core 15 formed of a ribbon spirally wound upon a central annulus and having radial recesses formed in its opposite sides or faces, in which recesses are embedded the radial windings, 1 and 2, and 3 and 4, respectively, two independent windings in each side face. The armature, as a whole, is independently supported by the annular frame—25—26—27—28, in the annular space between the polar extensions of the field magnet pole-pieces 22 and 23.

As shown in Figs. 1 and 3, the windings, as stated above, consist in two independent radial windings, 1 and 2, on one side of the disk, or one side of the armature core 15, with a similar pair of windings 3 and 4 (see Fig. 4) on the other side of the disk. Each separate winding consists in a continuous conductor, circumferentially, wound in loops to and from the inner and outer diametrical edges of the armature core 15, the circumferential distance between the centers of the radial portion of the conductors, in one loop, being equal to one-half the distance between the centers of the polar surfaces of the polar extensions of the field magnet. The terminals of each winding, which may be situated at any convenient portion of the circuit, are electrically connected, respectively, with binding posts 20, 17, 18, and 19, which are duplicated for the windings 3 and 4 on the other side of the armature.

The different windings, as shown, with respect to 1 and 2, in Fig. 3, and, with reference to all four, in Fig. 4, are so arranged, relative to each other, that the phase distance between the polar extensions of the field magnet is equally divided between them; that is, in this instance, the radial portions of the loops of winding No. 2 is set one-quarter of the distance between the centers of the polar surfaces of the polar extensions of the field magnets behind, in the direction of rotation of the field magnet, the position of the same portion of the winding No. 1; and No. 3 behind No. 2 the same distance; and No. 4 behind No. 3. In connecting up the machine, the terminals of each coil are preferably brought to a separate binding post, and there the inner terminals of windings Nos. 1 and 3, the inner terminals of Nos. 2 and 4, and the outer terminals of Nos. 3 and 4 connected, respectively, together, thereby necessitating, as is shown by the terminal connections in Fig. 4, and by the relative positions of the current curves of different phases in Fig. 5, only three external circuits—two leading and one common return; that is, in a system of distribution for four-phase currents to converters, or other means of utilizing the same, only three metallic conductors, or, when the ground is used for the common return, only two metallic conductors.

It is evident that, were the generator constructed to generate multiphase currents of a larger number than four, as described, the same system of internal cross-connecting of the armature windings might be extended to adapt the same to the employment of a number of external circuits, for the distribution of the currents generated thereby, proportionately less as the number of phases is increased; as, for instance, for a six-phase machine, three leaders and one common return; for an eight-phase machine, four leaders and one common return. In general a system employing a number of external conductors greater by one than one-half of the number of phases; and, while I have described and illustrated the adaptation of this system of armature windings and terminal connections for a four-phase current machine, I do not desire to be limited, in this feature of my invention, to a four-phase machine, but claim the same in its adaptation to multiphase machines in general.

As shown in Fig. 6, the armature windings are embedded in the side faces of the iron core 15. In the drawings, the marginal distance between the windings and the outer surface of the core 15 is, necessarily, exaggerated, the thickness of metal thereat being, of course, as small as is practicable, mechanically. By thus embedding the windings, two distinct results are attained. The air space is at once materially reduced, thereby forming a much more efficient path for the lines of force between the polar extensions of the field magnet, enabling them to be comparatively more distantly separated, and reducing to a minimum the Foucault currents in the copper and iron of the armature.

As shown in Fig. 6, the polar surface of the radial polar extensions 5 of the pole-pieces 22 and 23 of the field magnet are rounded off so as to concentrate the lines of force or prevent the straying of the lines of force, and to render more gradual the approach and recedence of the poles, relative to any part of the armature.

The lower members 25 and 26 of the supporting annular frame 25—26—27—28 are preferably constructed of some non-magnetic metal, the frame, as a whole, being divided, as shown in Fig. 2, in a plane perpendicular to the axis of rotation. The ring, as a whole, is, also, diametrically divided, as shown in Fig. 1, horizontally. The object of the first or perpendicular division is this:—Being, at the bottom, so close to the revolving extremities of the polar extensions of the field magnet, there might exist thereat a short circuit for the lines of force, which, in this way, is obviated. The use of the second division is to render more easy the dismantling of the machine.

I claim—

1. In an alternate current dynamo, an armature wound with a plurality of coils, adapted to produce a succession of current impulses, the inner terminals of the said coils of opposite polarity being internally connected together in series, and the first or second half of the outer terminals of the series of coils of succeeding phases being externally connected together in multiple, or vice versa, substantially as described and for the purposes specified.

2. In an alternate current dynamo, the herein-described arrangement of armature coils, consisting in a plurality of independent coils equally divided on each side of a disk armature and placed, relative to each other, circumferentially, so as to sub-divide the phases of the said machine into a number corresponding to twice the number of coils on one side of said disk armature, substantially as described.

3. In an alternate current dynamo, an armature wound with a plurality of coils adapted to produce current impulses of four succeeding phases, the inner terminals of the coils of the first and third phases and of the second and fourth phases being, respectively, connected together in series, and the outer terminals of either one and two, or three and four, being connected together in multiple, or vice versa, substantially as described and for the purposes specified.

4. In an alternate current dynamo, an armature wound with a plurality of coils adapted to produce multi-phase current impulses, the inner terminals of the coils of alternate phases being, respectively, connected in series and the outer terminals of two successive coils being connected in multiple, or vice versa, substantially as set forth.

5. In an alternate current dynamo, an armature having a plurality of coils adapted to produce multi-phase current impulses, the inner terminals of coils of alternate phases being connected, respectively, in series, and the outer terminals of two successive coils being connected in multiple, or vice versa, in combination with a field-magnet having two series of radial polar extensions arranged on opposite sides of said armature, coils, substantially as set forth.

In testimony whereof I have affixed my signature, in presence of two witnesses, this 20th day of June, 1892.

H. O. C. EDMUND WAGEMANN.

Witnesses:
A. RAINES,
H. K. WAGNER.